US012621378B2

(12) United States Patent
Cheng et al.

(10) Patent No.: US 12,621,378 B2
(45) Date of Patent: May 5, 2026

(54) FOLDING MECHANISM, SUPPORT STRUCTURE, AND ELECTRONIC DEVICE

(71) Applicant: VIVO MOBILE COMMUNICATION CO., LTD., Guangdong (CN)

(72) Inventors: Dongcun Cheng, Guangdong (CN); Dongqin Zhao, Guangdong (CN); Wenhui Zeng, Guangdong (CN); Jingwei Xu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 347 days.

(21) Appl. No.: 18/468,051

(22) Filed: Sep. 15, 2023

(65) Prior Publication Data

US 2024/0007552 A1 Jan. 4, 2024

Related U.S. Application Data

(63) Continuation of application No. PCT/CN2022/080878, filed on Mar. 15, 2022.

(30) Foreign Application Priority Data

Mar. 19, 2021 (CN) ......................... 202110297133.X

(51) Int. Cl.
 *H04M 1/00* (2006.01)
 *H04M 1/02* (2006.01)
(52) U.S. Cl.
 CPC ....... *H04M 1/0216* (2013.01); *H04M 1/0268* (2013.01)

(58) Field of Classification Search
 CPC ..... H04M 1/0216; H04M 1/0268; G06F 1/16; G06F 1/1616; G06F 1/1641; G06F 1/1652; G06F 1/1681
 See application file for complete search history.

(56) References Cited

U.S. PATENT DOCUMENTS

| | | | |
|---|---|---|---|
| 9,348,450 B1 | 5/2016 | Kim | |
| 10,606,320 B2 | 3/2020 | Bi | |
| 10,664,021 B1* | 5/2020 | Hsu | ...................... H04B 1/3888 |
| 2015/0366089 A1* | 12/2015 | Park | ................... H04M 1/0268 |
| | | | 361/679.01 |

(Continued)

FOREIGN PATENT DOCUMENTS

| | | | |
|---|---|---|---|
| CN | 103067926 A | 4/2013 | |
| CN | 106255935 A | 12/2016 | |

(Continued)

OTHER PUBLICATIONS

First Indian Office Action for Indian Patent Application No. 202317070659 dispatched Nov. 18, 2025, 6 pages.

*Primary Examiner* — Ping Y Hsieh
(74) *Attorney, Agent, or Firm* — Price Heneveld LLP

(57) ABSTRACT

A folding mechanism, a support structure, and an electronic device are provided. The folding mechanism includes a first screen supporting plate, a second screen supporting plate, a first housing base rotatably matching the first screen supporting plate, a second housing base rotatably matching the second screen supporting plate, and a base portion. The first housing base and the second housing base are rotatably connected to a plurality of first rotation portions of the base portion in a one-to-one correspondence manner by means of respective second rotation portions.

19 Claims, 4 Drawing Sheets

(56)     References Cited

U.S. PATENT DOCUMENTS

| | | | | |
|---|---|---|---|---|
| 2019/0390703 | A1* | 12/2019 | Hsu | E05D 11/082 |
| 2020/0267851 | A1 | 8/2020 | Hou et al. | |
| 2020/0326751 | A1* | 10/2020 | Kim | G06F 1/1616 |
| 2020/0363843 | A1 | 11/2020 | Cheng | |
| 2021/0044682 | A1 | 2/2021 | Liu et al. | |
| 2021/0191475 | A1 | 6/2021 | Park et al. | |
| 2022/0116489 | A1 | 4/2022 | Nagai et al. | |
| 2022/0308634 | A1* | 9/2022 | Hou | G06F 1/1641 |
| 2023/0185338 | A1* | 6/2023 | Seo | G06F 1/1681 |
| | | | | 361/679.28 |

FOREIGN PATENT DOCUMENTS

| | | | |
|---|---|---|---|
| CN | 107508934 | A | 12/2017 |
| CN | 108322567 | A | 7/2018 |
| CN | 208190691 | U | 12/2018 |
| CN | 109257460 | A | 1/2019 |
| CN | 208673636 | U | 3/2019 |
| CN | 109658826 | A | 4/2019 |
| CN | 208686793 | U | 4/2019 |
| CN | 108322567 | B | 11/2019 |
| CN | 111147637 | A | 5/2020 |
| CN | 111448605 | A | 7/2020 |
| CN | 111583791 | A | 8/2020 |
| CN | 212624631 | U | 2/2021 |
| CN | 113067922 | A | 7/2021 |
| JP | 2017510065 | A | 4/2017 |
| JP | 2021033192 | A | 3/2021 |
| WO | 2020259646 | A1 | 12/2020 |

* cited by examiner

FOLDING MECHANISM, SUPPORT STRUCTURE, AND ELECTRONIC DEVICE

CROSS-REFERENCE TO RELATED APPLICATIONS

The disclosure is a continuation application of International Application No. PCT/CN2022/080878 filed on Mar. 15, 2022, which claims the priority of Chinese patent application No. 202110297133.X, filed with China National Intellectual Property Administration on Mar. 19, 2021 and entitled "FOLDING MECHANISM, SUPPORT STRUCTURE, AND ELECTRONIC DEVICE", the entire contents of which are incorporated herein by reference.

TECHNICAL FIELD

This application belongs to the technical field of communication devices, and specifically relates to a folding mechanism, a support structure, and an electronic device.

BACKGROUND

As technologies evolve, electronic devices such as phones are becoming more and more diversified, such as tablet type, sliding type and foldable type. Foldable electronic devices are increasingly favored by consumers because of their advantages such as large display area and high portability. Foldable electronic devices are generally classified into inward foldable type and outward foldable type. The inward foldable type can better protect the display screen, and thus, is used by more manufacturers. However, while the display screen is folded inward, it is prone to forming a crease on the display screen, causing a shorter service life of the display screen.

SUMMARY

This application discloses a folding mechanism, a support structure, and an electronic device.

In a first aspect, an embodiment of this application discloses a folding mechanism, including a first screen supporting plate, a second screen supporting plate, a first housing base, a second housing base, and a base portion.

The first housing base is arranged on the first screen supporting plate, and the first screen supporting plate rotatably matches the first housing base.

The second housing base is arranged on the second screen supporting plate, and the second screen supporting plate rotatably matches the second housing base.

The base portion is provided with a plurality of first rotation portions, and the first housing base and the second housing base are rotatably connected to the plurality of first rotation portions in a one-to-one correspondence manner by means of respective second rotation portions.

The folding mechanism has an unfolded state and a folded state. In the unfolded state, respective first side edges of the first screen supporting plate and the second screen supporting plate are each located between respective second side edges, and a first surface of the first screen supporting plate and a first surface of the second screen supporting plate facing away from the base portion are flush.

In the folded state, a distance between the respective first side edges of the first screen supporting plate and the second screen supporting plate is greater than a distance between the respective second side edges of the first screen supporting plate and the second screen supporting plate.

In a second aspect, an embodiment of this application discloses a support structure, including a first housing, a second housing, and a folding mechanism described above.

A first housing base is fixedly connected to the first housing, and a side of the first housing and a side of the first housing base facing a first screen supporting plate are each provided with an inclined avoidance supporting surface.

A second housing base is fixedly connected to the second housing, and a side of the second housing and a side of the second housing base facing a second screen supporting plate are each provided with an inclined avoidance supporting surface.

In a folded state, the first screen supporting plate and the second screen supporting plate are respectively supported on the corresponding inclined avoidance supporting surface.

In a third aspect, an embodiment of this application provides an electronic device, including a first display module and a support structure described above. The first display module includes a flexible display screen. The first display module is mounted on the support structure, and the first display module is supportable on a first housing, a second housing, a first screen supporting plate a second screen supporting plate.

The embodiment of this application provides a folding mechanism, including the first screen supporting plate, the second screen supporting plate, the first housing base, the second housing base, and the base portion. The first screen supporting plate is rotatably connected to the first housing base, and the second screen supporting plate is rotatably connected to the second housing base. Both the first housing base and the second housing base are rotatably connected to the base portion. The first screen supporting plate and the second screen supporting plate can rotate relative to each other along with the first housing base and the second housing base. The first screen supporting plate can rotate relative to the first housing base, and the second screen supporting plate can rotate relative to the second housing base, so that the folding mechanism can switch between the folded state and the unfolded state. In the unfolded state, the respective first side edges of the first screen supporting plate and the second screen supporting plate are each located between the respective second side edges, and the first surface of the first screen supporting plate and the first surface of the second screen supporting plate facing away from the base portion are flush, so that the first display module of the electronic device can be supported reliably, thereby ensuring the first display module to be in the unfolded state and providing a large display area for the user. In the folded state, the distance between the respective first side edges of the first screen supporting plate and the second screen supporting plate is greater than the distance between the respective second side edges, so that the first screen supporting plate and the second screen supporting plate form a flared structure whose flare faces the base portion. While the flared structure is folded along with the folding mechanism, a middle part of the first display module is accommodated at the flared structure formed by the first screen supporting plate and the second screen supporting plate, so that the middle part of the first display module is folded to a relatively small extent, which can maximally avoid forming the crease on the display screen such as the first display module, thereby prolonging the service life of the display screen. In addition, when the electronic device using the folding mechanism is in use, the electronic device in the folded state has relatively small overall size and relatively high portability, and thus, is convenient for the user to carry.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the accompanying drawings.

DESCRIPTIONS OF REFERENCE NUMERALS

110—first housing, 120—second housing,
201—first surface, 202—second surface, 203—first side edge, 205—accommodating sink, 210—first screen supporting plate, 220—second screen supporting plate,
302—second rotation portion, 303—avoidance groove, 310—first housing base, 320—second housing base,
410—base portion, 411—accommodating slot, 412—first rotation portion, 420—lid,
510—third rotation portion, 520—fourth rotation portion, 610—first display module, 620—second display module.

DETAILED DESCRIPTION

To clearly states the objectives, technical solutions, and advantages of this application, the technical solutions of this application will be clearly and completely described below with reference to specific embodiments of this application and the accompanying drawings. Apparently, the described embodiments are only some embodiments rather than all the embodiments of this application. All other embodiments obtained by a person of ordinary skill in the art based on the embodiments of this application without creative efforts shall fall within the protection scope of this application.

The following describes the technical solution disclosed in each embodiment of this application in detail with reference to the accompanying drawings.

As shown in FIG. 1 to FIG. 6, embodiments of this application disclose a folding mechanism, a support structure, and an electronic device. The electronic device may be a foldable electronic device. The electronic device may include a first display module 610 and the above support structure. The support structure may include a first housing 110, a second housing 120, and the above folding mechanism. By using the above folding mechanism, the electronic device can switch between a folded state and an unfolded state.

Figure 1:
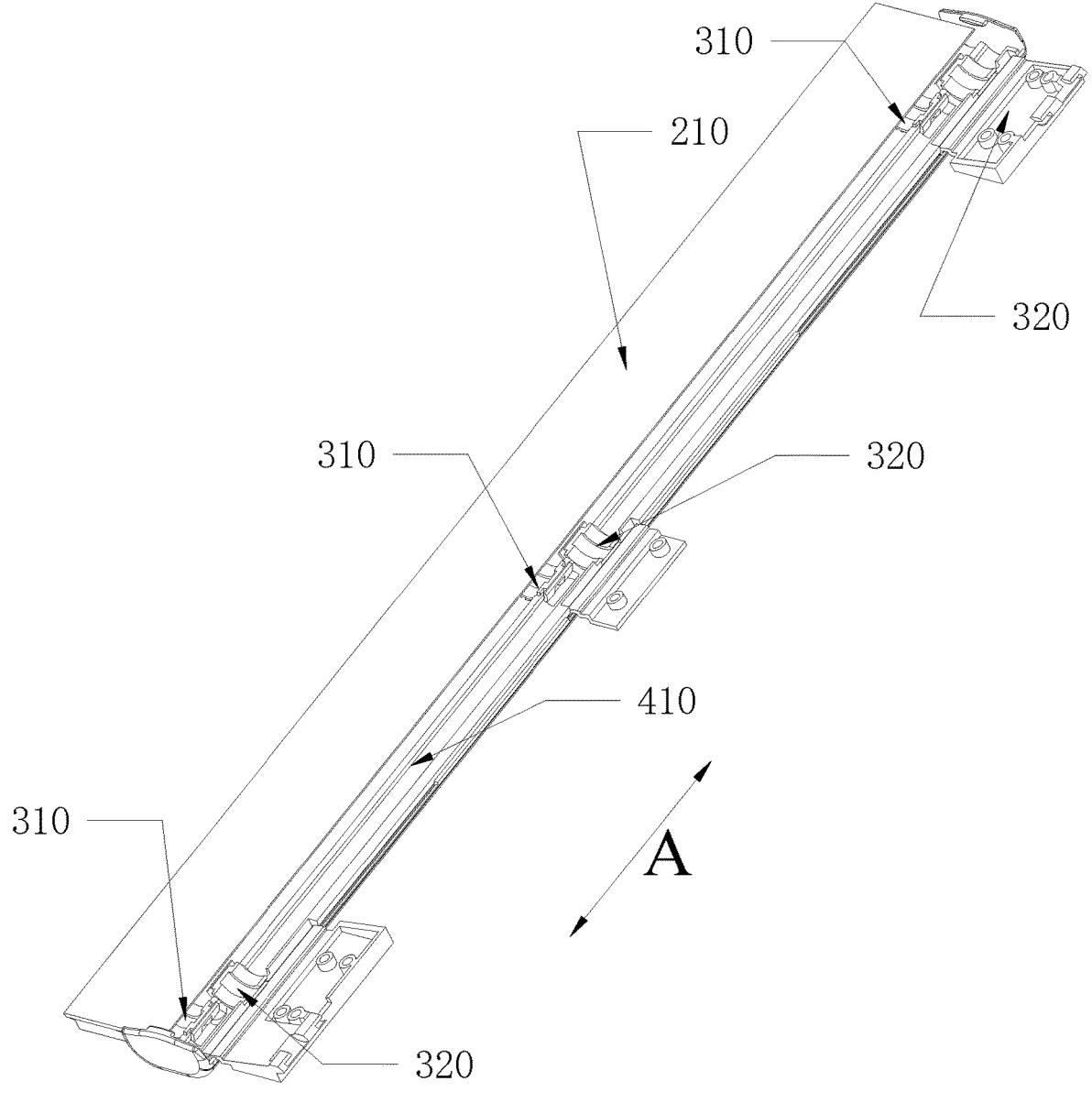
FIG. 1 is a schematic view showing a part of the structure in a support structure according to an embodiment of this application.
Figure 2:
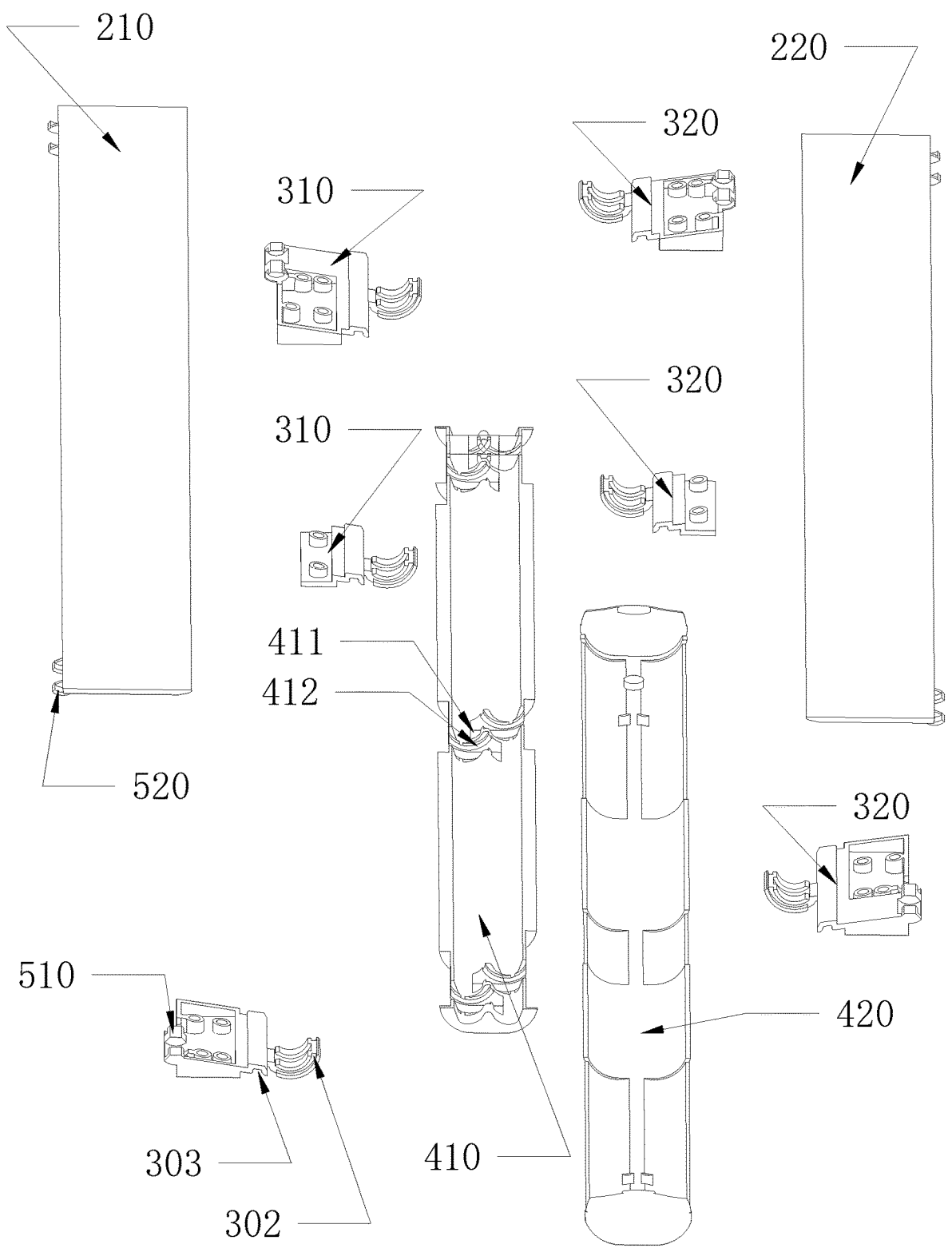
FIG. 2 is a schematic exploded view of a part of the structure in the support structure according to an embodiment of this application.

As shown in FIG. 1 and FIG. 2, the folding mechanism disclosed in this embodiment of this application includes a first screen supporting plate 210, a second screen supporting plate 220, a first housing base 310, a second housing base 320, and a base portion 410. In order to improve the symmetry of the folding mechanism and the folding performance of the whole folding mechanism, the first screen supporting plate 210 and the second screen supporting plate 220 may be arranged in structural symmetry respectively on two opposite sides of the base portion 410. Accordingly, the first housing base 310 and the second housing base 320 are arranged in structural symmetry, and a first rotation portion 412 on the base portion 410 which matches the first housing base 310 and a first rotation portion 412 on the base portion 410 which matches the second housing base 320 are each arranged in symmetry.

The base portion 410 is a basic structural member of the folding mechanism. The base portion 410 can provide a mounting basis for other components of the folding mechanism, so that the other components of the folding mechanism can be mounted directly or indirectly on the basis of the base portion 410. Optionally, the base portion 410 is a thin plate to reduce the occupied space. Specifically, the base portion 410 may be a metal plate. The metal plate can make the base portion 410 with a small thickness have sufficient strength, which thereby avoids affecting the supporting performance of the base portion 410.

The base portion 410 is provided with a plurality of first rotation portions 412. The first housing base 310 and the second housing base 320 each include second rotation portions 302. The plurality of second rotation portions 302 may match the plurality of first rotation portions 412 in a one-to-one correspondence manner, so that both the first housing base 310 and the second housing base 320 can rotatably match the base portion 410 stably, thereby ensuring that the first housing base 310 is connected with the second housing base 320 into a whole by means of the base portion 410.

Specifically, a number of the first rotation portion 412 may be two. One of the two first rotation portions 412 matches the second rotation portion 302 of the first housing base 310, and the other matches the second rotation portion 302 of the second housing base 320. In this case, the two second rotation portions 302 may be arranged on the base portion 410 in symmetry, thereby ensuring that the folding mechanism has better folding performance. Of course, in a case that the number of the first rotation portions 412 matching the first housing base 310 is plural, the plurality of second rotation portions 302 may be arranged at intervals along an axis direction of the base portion 410, i.e., a rotation axis direction of the second rotation portion 302. Accordingly, the number of the second rotation portions 302 matching the second housing base 320 may be plural. By using the above technical solution, the reliability of connection and rotatable matching between the first housing base 310 and the second housing base 320 can be further improved. The rotation axis direction of the second rotation portion 302 may be direction A in FIG. 1.

The first rotation portion 412 and the second rotation portion 302 are rotational structural members matching each other. For example, they may be a shaft hole matching structure. In another embodiment of this application, one of the first rotation portion 412 and the second rotation portion 302 may be an arc-shaped slot-like structure, and the other may be an arc-shaped block-like structural member. In this case, the stability of rotatable matching between the first rotation portion 412 and the second rotation portion 302 can be improved to some extent. Besides, the base portion 410 may be an arc-shaped structural member so as to provide a better formation basis for the first rotation portion 412 and reduce the overall size of the base portion 410.

As shown in FIG. 1 in conjunction with FIG. 3 to FIG. 6, the first housing base 310 is arranged on the first screen supporting plate 210, and the first screen supporting plate 210 rotatably matches the first housing base 310. The second housing base 320 is arranged on the second screen supporting plate 220, and the second screen supporting plate 220 rotatably matches the second housing base 320. In a case that the above folding mechanism is applied to an electronic device, the first screen supporting plate 210 and the second screen supporting plate 220 can both support the first display module 610. In order to prevent the existence of the first housing base 310 and the second housing base 320 from making the first display module 610 ineffectively supported, the first housing base 310 is arranged on a side of the first screen supporting plate 210 facing away from the first display module 610, and accordingly, the second housing base 320 is arranged on a side of the second screen supporting plate 220 facing away from the first display module 610. Optionally, the first housing base 310 and the first screen supporting plate 210, and the second housing base 320 and the second screen supporting plate 220 may rotatably match each other by means of a rotational structural member such as a shaft-hole rotational structural member. In addition, a maximum relative rotation angle between the first screen supporting plate 210 and the first housing base 310 may be equal to a maximum relative rotation angle between the second screen supporting plate 220 and the second housing base 320, so that the whole folding mechanism has better symmetry, thereby improving the overall performance of the folding mechanism.

The folding mechanism has an unfolded state and a folded state. By making both the first housing base 310 and the second housing base 320 move relatively on the basis of the base portion 410, the whole folding mechanism can switch between the folded state and the unfolded state. Besides, while the folding mechanism switches between states, both the first screen supporting plate 210 and the second screen supporting plate 220 can move relative to the base portion 410. Moreover, as shown in FIG. 4 to FIG. 6, the first screen supporting plate 210 and the first housing base 310 can move relatively, and the second screen supporting plate 220 and the second housing base 320 can move relatively.

The first screen supporting plate 210 and the second screen supporting plate 220 each have a first side edge 203 and a second side edge arranged opposite to each other, and the first screen supporting plate 210 and the second screen supporting plate 220 each have a first surface 201 and a second surface 202 arranged opposite to each other. The first surfaces 201 of the first screen supporting plate 210 and the second screen supporting plate 220 face away from the base portion 410. That is, the first screen supporting plate 210 and the second screen supporting plate 220 are arranged on a same side of the base portion 410, and the first surfaces 201 both serve as the supporting surfaces of the screen so as to support the first display module 610, etc. In the first screen supporting plate 210 and the second screen supporting plate 220, the second surface 202 arranged opposite to the first surface 201 faces the base portion 410.

Figure 4:
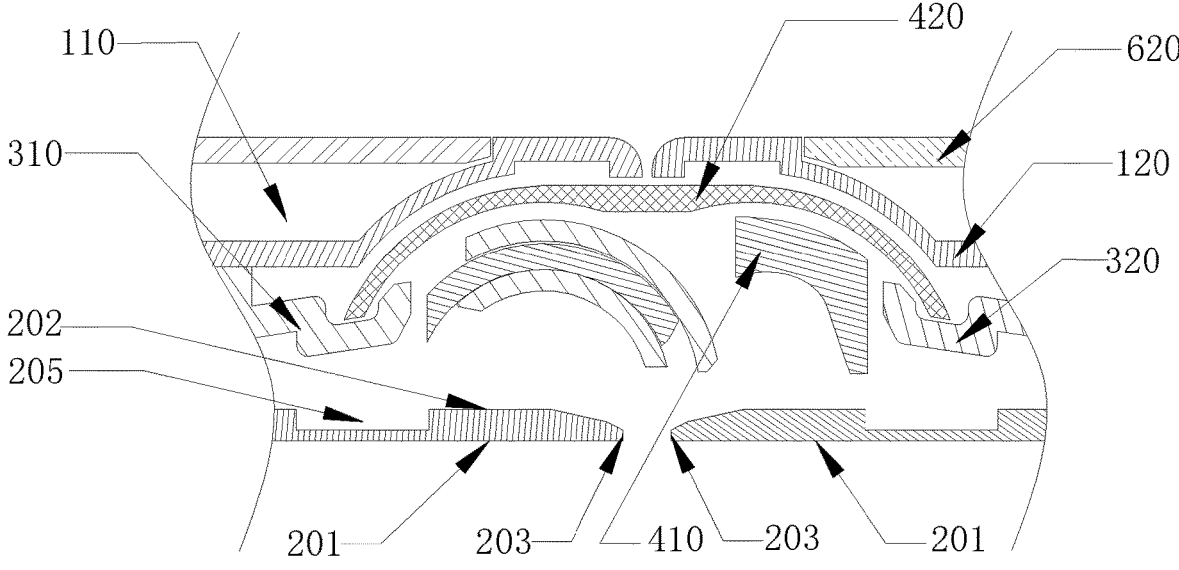
FIG. 4 is a schematic enlarged view of a part of the structure in FIG. 3.
Figure 5:
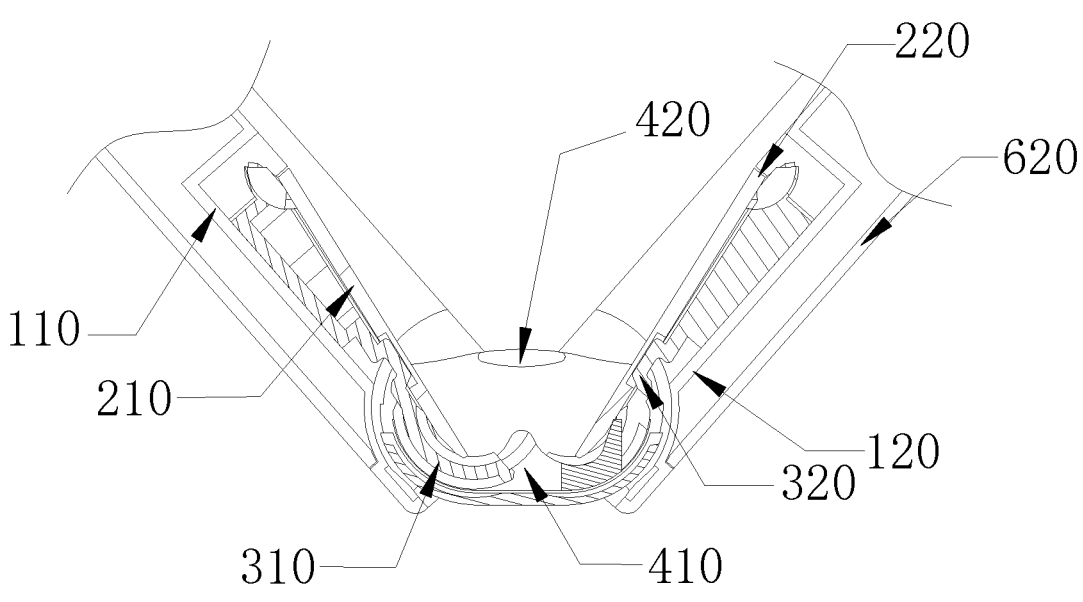
FIG. 5 is a schematic cross-sectional view of the support structure in the other state according to an embodiment of this application.

As shown in FIG. 4, in the unfolded state, the respective first side edges 203 of the first screen supporting plate 210 and the second screen supporting plate 220 are each located between the respective second side edges, and the first surface 201 of the first screen supporting plate 210 and the first surface of the second screen supporting plate 220 facing away from the base portion 410 are flush.

Figure 6:
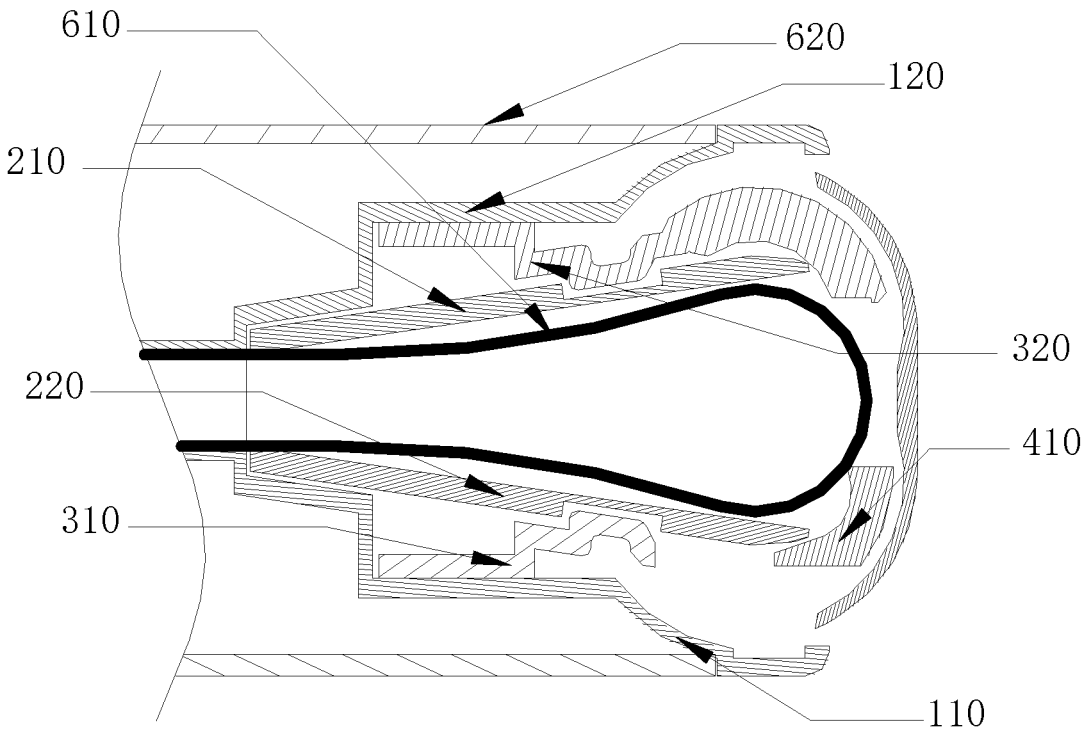
FIG. 6 is a schematic view of an electronic device according to an embodiment of this application.

As shown in FIG. 6, in the folded state, a distance between the respective first side edges 203 of the first screen supporting plate 210 and the second screen supporting plate 220 is greater than a distance between the respective second side edges of the first screen supporting plate 210 and the second screen supporting plate 220.

In detail, in the unfolded state, the first screen supporting plate 210 and the second screen supporting plate 220 are flush, so that both of the first screen supporting plate and the second screen supporting plate can support the first display module 610, thereby ensuring that the first display module 610 is in the unfolded state stably. As shown in FIG. 4 and FIG. 6, while the folding mechanism switches from the unfolded state to the folded state, a relative rotation angle between the first screen supporting plate 210 and the second screen supporting plate 220 is greater than 180°, so that in the folded state, the distance between the respective first side edges 203 of the first screen supporting plate 210 and the second screen supporting plate 220 can be greater than the distance between the respective second side edges.

In addition, as described above, the folding mechanism may be applied to the support structure. When the support structure is folded to the folded state along with the folding mechanism, as shown in FIG. 6, the first housing 110 and the second housing 120 are stacked, and respective screen supporting surfaces of the first housing 110 and the second housing 120 are arranged in parallel, thereby ensuring that the two parts of the first display module 610 supported by the first housing 110 and the second housing 120 can be parallel to each other. In the process of assembling the first screen supporting plate 210 and the first housing base 310, as shown in FIG. 4, a rotatable connection structure (the rotation component mentioned below) between the first screen supporting plate 210 and the first housing base 310 may be arranged at a position of the first screen supporting plate 210 near its first side edge 203. In this way, when the first screen supporting plate 210 and the first housing base 310 rotate relatively, the first screen supporting plate 210 can rotate basically with its second side edge as the axis, which prevents the second side edge of the first screen supporting plate 210 from rotating in a direction away from the first housing base 310 when the first side edge 203 of the first screen supporting plate 210 rotates towards the first housing base 310, thereby ensuring that the first screen supporting plate 210 can always effectively support the first display module 610 and other components.

Based on the above, as shown in FIG. 6, the distance between the respective second side edges of the first screen supporting plate 210 and the second screen supporting plate 220 is equal to or basically equal to the distance between the respective screen supporting surfaces of the first housing 110 and the second housing 120 in the support structure in the folded state. Therefore, it may also be considered that in the folded state, the distance between the respective first side edges 203 of the first screen supporting plate 210 and the second screen supporting plate 220 is greater than the distance between the first housing 110 and the second housing 120.

More specifically, the specific value of the distance between the respective first side edges 203 of the first screen supporting plate 210 and the second screen supporting plate 220 in the folding mechanism in the folded state may be determined according to parameters such as widths of the first screen supporting plate 210 and the second screen supporting plate 220. The width is along a direction perpendicular to the rotation axis direction of the second rotation portion 302, which, more specifically, may be direction B in FIG. 3.

It is to be noted that in order to ensure that the relative rotation angle between the first screen supporting plate 210 and the second screen supporting plate 220 is greater than 180°, it is required to ensure that the first screen supporting plate 210 can move relative to the first housing base 310 and that the second screen supporting plate 220 can move relative to the second housing base 320. More specifically, in order to achieve the above objective, the specific structure and/or mounting position and other parameters of the components such as the base portion 410, the first housing base 310 and the second housing base 320 can be limited.

Figure 3:
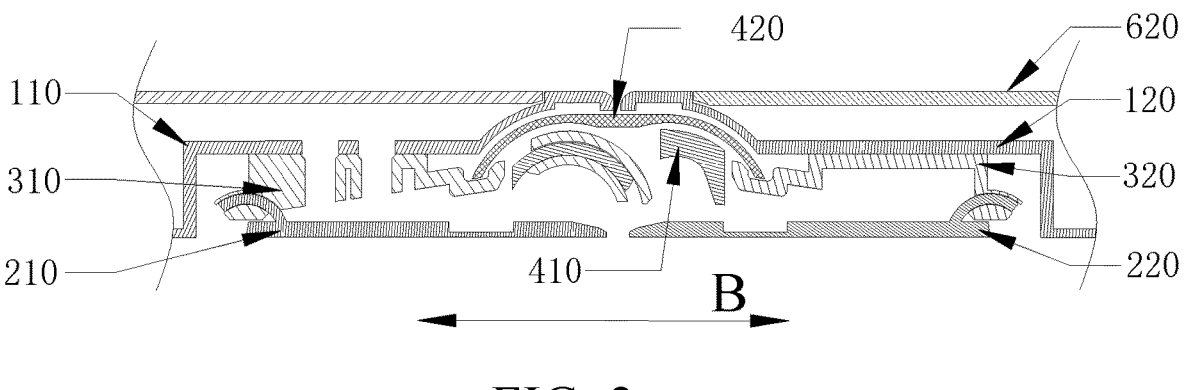
FIG. 3 is a schematic cross-sectional view of the support structure in one state according to an embodiment of this application.

In an example of the first screen supporting plate 210, in the unfolded state, as shown in FIG. 3, it is required to ensure the part from the rotatable connection position between the first screen supporting plate 210 and the first housing base 310 to the first side edge 203 of the first screen supporting plate 210 to be spaced from the components such as the first housing base 310, the base portion 410 and the first housing 110, thereby providing an avoidance space for the first screen supporting plate 210 to rotate towards the first housing base 310. This is similar to the design and arrangement of the components such as the second housing base 320, the base portion 410 and the second housing 120 corresponding to the second screen supporting plate 220.

This embodiment of this application provides the folding mechanism, including the first screen supporting plate 210, the second screen supporting plate 220, the first housing base 310, the second housing base 320, and the base portion 410. The first screen supporting plate 210 is rotatably connected to the first housing base 310, and the second screen supporting plate 220 is rotatably connected to the second housing base 320. Both the first housing base 310 and the second housing base 320 are rotatably connected to the base portion 410. The first screen supporting plate 210 and the second screen supporting plate 220 can rotate relative to each other along with the first housing base 310 and the second housing base 320. The first screen supporting plate 210 can rotate relative to the first housing base 310, and the second screen supporting plate 220 can rotate relative to the second housing base 320, so that the folding mechanism can switch between the folded state and the unfolded state. In the unfolded state, the respective first side edges 203 of the first screen supporting plate 210 and the second screen supporting plate 220 are each located between the respective second side edges, and the first surface 201 of the first screen supporting plate 210 and the first surface of the second screen supporting plate 220 facing away from the base portion 410 are flush, so that the first display module 610 of the electronic device can be supported reliably, thereby ensuring the first display module 610 to be in the unfolded state and providing a large display area for the user. In the folded state, the distance between the respective first side edges 203 of the first screen supporting plate 210 and the second screen supporting plate 220 is greater than the distance between the respective second side edges, so that the first screen supporting plate 210 and the second screen supporting plate 220 form a flared structure whose flare faces the base portion 410. While the flared structure is folded along with the folding mechanism, a middle part of the first display module 610 is accommodated at the flared structure formed by the first screen supporting plate 210 and the second screen supporting plate 220, so that the middle part of the first display module 610 is folded to a relatively small extent, which can maximally avoid forming the crease on the display screen such as the first display module 610, thereby prolonging the service life of the display screen. In addition, when the electronic device using the folding mechanism is in use, the electronic device in the folded state has relatively small overall size and relatively high portability, and thus, is convenient for the user to carry.

Optionally, as shown in FIG. 1 and FIG. 6, the folding mechanism further includes a lid 420. The lid 420 is fixedly connected to a side of the base portion 410 facing away from the first screen supporting plate 210. The lid 420 can protect the base portion 410. Moreover, the lid 420 can shield the folding mechanism, so that when the folding mechanism is applied to an electronic device, the number of exposed components of the electronic device can be minimized. On the one hand, the exterior performance of the electronic device is improved. On the other hand, the dustproof and waterproof performance of the electronic device can be improved, thereby improving the reliability of the electronic device. The lid 420 may be fixed to the base portion 410 by means of bonding or other ways. In another embodiment of this application, the base portion 410 and the lid 420 may be fixedly connected in a detachable way by means of threaded connecting members such as screws, so as to improve the reliability of connection therebetween.

In the folded state, a projection of the lid 420 in a plane where a distribution direction of the first screen supporting plate 210 and the second screen supporting plate 220 and a rotation axis direction of the second rotation portion 302 are located covers the first housing base 310, the second housing base 320 and the base portion 410, thereby ensuring that the lid 420 has a better shielding effect. It is to be noted that the distribution direction of the first screen supporting plate 210 and the second screen supporting plate 220 may be direction B in FIG. 3.

Specifically, parameters such as the structure, size and mounting position of the lid 420 may be designed according to the parameters such as the specific structure and size of the other components in the folding mechanism, so that when the folding mechanism in the folded state is viewed from the side where the lid 420 is located, the first housing base 310, the second housing base 320 and the base portion 410 in the folding mechanism can all be shielded by the lid 420. More specifically, in order to the improve the shielding effect of the lid 420 on the other components, as shown in FIG. 6, the whole lid 420 may be an arc-shaped structural member, which can improve the tightness of connection between the lid 420 and the first housing 110 and second housing 120 in the support structure and further improve the sealing performance of the support structure and the electronic device.

Further, as shown in FIG. 2 and FIG. 3, the first housing base 310 and/or the second housing base 320 include/ includes an avoidance structure. The avoidance structure is provided with an avoidance groove 303, and in the unfolded state, a side edge of the lid 420 is accommodated into the avoidance groove 303. Specifically, parameters such as position and size of the avoidance groove 303 may be flexibly determined according to parameters such as extending position and thickness of the lid 420, which is not limited here.

More specifically, the first housing base 310 and the second housing base 320 are each provided with the avoidance groove 303. In this case, the avoidance groove 303 can provide an avoidance space for the side edge of the lid 420, so that the size that the lid 420 can extend along the two side edges arranged opposite to each other in direction B in FIG. 3 towards the first screen supporting plate 210 and the second screen supporting plate 220 can be larger, thereby improving the bending degree of the lid 420. Thereby, when the folding mechanism is in the folded state, a gap between the lid 420 and the first housing 110 and second housing 120 is smaller, so that the lid, the first housing and the second housing can match more reliably.

In an example of the first housing base 310, in a case that the first housing base 310 is provided with the avoidance structure, in order to ensure that the structural strength of the first housing base 310 can still meet the use requirements, as shown in FIG. 4, the position where the avoidance structure is located may protrude to the side facing away from the avoidance groove 303. Based on the above, further, the first screen supporting plate 210 may be provided with an accommodating sink 205. As shown in FIG. 6, in the folded state, at least a part of the avoidance structure is accommodated in the accommodating sink 205, thereby avoiding producing an adverse effect on the maximum relative rotation angle between the first screen supporting plate 210 and the first housing base 310 due to the avoidance structure arranged on the first housing base 310.

Specifically, parameters such as position, width and depth of the accommodating sink 205 may be flexibly determined according to actual parameters of the avoidance structure, which is not limited here. More specifically, the second housing base 320 may also be provided with the corresponding avoidance structure, and the second screen supporting plate 220 is also correspondingly provided with an accommodating sink 205, so that the symmetry of the folding mechanism is improved, thereby improving the overall performance of the folding mechanism.

In order to improve the structure compactness of the whole folding mechanism, as shown in FIG. 2, the base portion 410 may be provided with an accommodating slot 411. The first rotation portions 412 are arranged in the accommodating slot 411. Moreover, at least a part of the second rotation portion 302 of the first housing base 310 and at least a part of the second rotation portion 302 of the second housing base 320 are accommodated in the accommodating slot 411, which can reduce the space occupied by the folding mechanism in a thickness direction of the base portion 410, thereby reducing the thickness of the whole electronic device and improving the comprehensive performance of the product. It is to be noted that the thickness direction of the base portion 410 may specifically be a direction perpendicular to direction A in FIG. 1 and direction B in FIG. 3.

Specifically, the size of the accommodating slot 411 may be increased, so that the plurality of first rotation portions 412 can be all arranged in one accommodating slot 411. In another embodiment of this application, in order to improve matching stability between the first housing base 310 and second housing base 320 and the base portion 410 and prevent the first housing base 310 and the second housing base 320 from interfering with each other, there may be a plurality of the accommodating slots 411 arranged corresponding to the number of the first rotation portions 412. Of course, in order to ensure that at least a part of the second rotation portion 302 accommodated in the accommodating slot 411 normally matches the first rotation portion 412, in the design and processing process, the specific structure of the first rotation portion 412 and the second rotation portion 302 can be adapted to the parameters such as structure and size of the accommodating slot 411.

Further, in order to maximally improve the reliability of rotatable matching between the first rotation portion 412 and the second rotation portion 302 in the accommodating slot

411, optionally, as shown in FIG. 2, one of the first rotation portion 412 and the second rotation portion 302 includes a slider, and the other is provided with a sliding groove. The sliding groove slidably matches the slider. The large matching area between the sliding groove and the slider can maximally utilize the space in the accommodating slot 411. Of course, both the sliding groove and the slider are arc-shaped structure, so that both the first housing base 310 and the second housing base 320 can rotatably match each other by the aid of the sliding groove and the slider that match slidably.

In order to further improve the stability of rotatable matching between the first housing base 310 and second housing base 320 and the base portion 410, as shown in FIG. 2, two opposite sides of the accommodating slot 411 are each provided with the first rotation portion 412. Accordingly, two opposite sides of the first housing base 310 and the second housing base 320 are each provided with the second rotation portion 302. In an example of the first housing base 310, in a case that the two second rotation portions 302 on its two opposite sides match the two first rotation portions 412 in one accommodating slot 411 in a one-to-one correspondence manner, the first housing base 310 can be prevented from rotating relative to the base portion 410 away from its own rotation axis, thereby improving the stability of rotatable matching between the first housing base 310 and the base portion 410. Accordingly, in a case of adopting the above technical solution, the rotatable matching between the second housing base 320 and the base portion 410 is also more stable.

In a case that the first rotation portion 412 is arranged in the accommodating slot 411, in order to ensure good rotatable matching between the first rotation portion 412 and the second rotation portion 302 while minimizing the width of the base portion 410 (i.e., the size of the base portion 410 along direction B in FIG. 3), optionally, in the rotation axis direction of the second rotation portion 302, the first rotation portions 412 may be arranged at intervals or staggered. That is, the plurality of first rotation portions 412 may be distributed along the rotation axis direction of the second rotation portion 302, and there is a preset interval between any two adjacent first rotation portions 412. Alternatively, in a case that the plurality of first rotation portions 412 are distributed along the rotation axis direction of the second rotation portion 302, the plurality of first rotation portions 412 may be grouped in pairs, and the two first rotation portions 412 in any group may be arranged adjacent to each other in the rotation axis direction of the second rotation portion 302. That is, there is no gap between the two first rotation portions 412 in the group in the rotation axis direction of the second rotation portion 302. By adopting this technical solution, on the one hand, the above technical objective can be achieved; and on the other hand, since the two first rotation portions 412 in the group are nearer to each other, by making the two first rotation portions 412 in any group correspondingly match the first housing base 310 and the second housing base 320 respectively, the symmetry between the first housing base 310 and the second housing base 320 can be improved to some extent, thereby improving the overall performance of the folding mechanism.

As described above, the first housing base 310 rotatably matches the first screen supporting plate 210, and accordingly, the second housing base 320 rotatably matches the second screen supporting plate 220. As described above, the first housing base 310 and the second housing base 320 may be arranged in symmetry, and the first screen supporting plate 210 and the second screen supporting plate 220 may also be arranged in symmetry. For the sake of brevity, the connection between the screen supporting plate and the housing base is described in an example of the first screen supporting plate 210 and the first housing base 310. Accordingly, reference can be made to this for the matching between the second screen supporting plate 220 and the second housing base 320.

Optionally, the first screen supporting plate 210 may be rotatably connected to the first housing 110 in the support structure, and as described above, the first housing base 310 is fixedly connected to the first housing 110. In this case, the first screen supporting plate 210 can rotatably match the first housing base 310. In order to facilitate mounting, as shown in FIG. 2, the folding mechanism may include rotation components. The first screen supporting plate 210 may be rotatably connected to the first housing base 310 by means of the plurality of rotation components. Under the action of the plurality of rotation components, on the one hand, the stability of rotatable matching between the first screen supporting plate 210 and the first housing base 310 can be improved, and on the other hand, more types of structures are available for the rotation components, which reduces the design and processing difficulty.

As shown in FIG. 2, the rotation components specifically include a third rotation portion 510 and a fourth rotation portion 520. One of the third rotation portion 510 and the fourth rotation portion 520 is connected to the first housing base 310, and the other is connected to the first screen supporting plate 210. The third rotation portion 510 includes an insert block, and the fourth rotation portion 520 is provided with an insertion slot. The insertion block and the insertion slot are each provided with an arc-shaped matching surface, and the insertion block rotatably matches the insertion slot by means of the arc-shaped matching surfaces, which can ensure a large rotatable matching area between the third rotation portion 510 and the fourth rotation portion 520, thereby improving the reliability of rotatable connection therebetween. Besides, in a case of adopting the above technical solution, by making the rotation axis of the third rotation portion 510 and the fourth rotation portion 520 be located on the first screen supporting plate 210 or on a side of the first screen supporting plate 210 facing away from the first housing base 310, in a case that the rotation components are located on a side of the first screen supporting plate 210 facing the first housing base 310, the distance between the first screen supporting plate 210 and the first housing base 310 can be smaller, thereby reducing the space occupied by the whole folding mechanism in the thickness direction of the base portion 410.

Specifically, by making the insertion block be adapted to the insertion slot in shape and size, the insertion block can rotatably match the insertion slot. Besides, the insertion slot may be opened on two sides, so that the insertion block can be mounted into the insertion slot from one side of the insertion slot. Moreover, the maximum relative rotation angle between the insertion block and the insertion slot can be limited by the aid of the other structures such as the first housing base 310 and the first housing 110. In addition, the relative position between the first screen supporting plate 210 and the first housing base 310 in the rotation axis direction of the second rotation portion 302 may be limited by means of arranging detachable limiting structures on two opposite ends of the first screen supporting plate 210 along the rotation axis direction of the second rotation portion 302, thereby preventing the relative movement between the first screen supporting plate and the first housing base in the above-described direction.

In another embodiment of this application, as shown in FIG. 2, the fourth rotation portion 520 includes a limiting member and a matching member. The limiting member and the matching member form the insertion slot, and the matching member is provided with the arc-shaped matching surface. In the rotation axis direction of the second rotation portion 302, respective limiting members of two fourth rotation portions 520 in the plurality of fourth rotation portions 520 are arranged opposite to each other, and at least two of the third rotation portions 510 are limited between or outside the above two limiting members arranged opposite to each other. In the structure of the folding mechanism shown in FIG. 2, the respective insertion slots of the two sets of fourth rotation portions 520 arranged on the two opposite ends of the first screen supporting plate 210 each face the outside, that is, the insertion slots of the two sets of fourth rotation portions 520 are arranged opposite to each other. In this case, the two sets of third rotation portions 510 matching the two sets of fourth rotation portions 520 should be respectively arranged on the outer side of the two sets of fourth rotation portions 520.

In a case of adopting the above technical solution, at least two third rotation portions 510 can be limited by the aid of the limiting members in the two fourth rotation portions 520, so that the third rotation portion 510 and the fourth rotation portion 520 can form a limiting matching in the rotation axis direction of the second rotation portion 302, thereby ensuring that the first screen supporting plate 210 stably matches the first housing base 310 in the rotation axis direction of the second rotation portion 302.

Further, as shown in FIG. 2, in at least one rotation component, the third rotation portion 510 includes a plurality of insertion blocks arranged at intervals along the rotation axis direction of the second rotation portion 302, and accordingly, the fourth rotation portion 520 is provided with a plurality of insertion slots arranged at intervals along the rotation axis direction of the second rotation portion 302. The plurality of insertion blocks match the plurality of insertion slots in a one-to-one correspondence manner. In this case, the third rotation portion 510 and the fourth rotation portion 520 in the rotation component may match each other by means of a plurality of matching surfaces. This can further improve the stability of rotatable matching between the third rotation portion 510 and the fourth rotation portion 520, thereby improving the reliability of rotatable matching between the first screen supporting plate 210 and the first housing base 310 and between the second screen supporting plate 220 and the second housing base 320.

In addition, as described above, while the first screen supporting plate 210 rotates relative to the base portion 410 along with the first housing base 310, the first screen supporting plate 210 and the first housing base 310 may also rotate relative to each other. More specifically, in the process of the first screen supporting plate 210 rotating towards the first housing base 310, the driving force may be increased by the flexible display screen in the electronic device. For the process of the first screen supporting plate 210 rotating away from the first housing base 310, structures such as elastic members may be arranged in the folding mechanism, so that the first screen supporting plate 210 is driven by elastic restoring force. Thereby, when the first housing base 310 and the second housing base 320 rotate to the unfolded state, the first screen supporting plate 210 and the screen supporting surface of the first housing 110 can be flush so as to jointly support the flexible display screen. In another embodiment of this application, a power drive apparatus such as a motor may be arranged between the first screen supporting plate 210 and the first housing 110. The power drive apparatus may also drive the first screen supporting plate 210 and the first housing base 310 to rotate towards each other or away from each other. Of course, the second housing base 320 and the second screen supporting plate 220 may be designed and produced with reference to any of the above technical solutions.

In order to improve the stability of motion of the folding mechanism, optionally, a number of the first housing bases 310 and/or a number of the second housing base 320 are/is plural. Optionally, the number of the first housing bases 310 and the number of the second housing bases 320 are the same and are each plural. By arranging the plurality of first housing bases 310 and the plurality of second housing bases 320 in groups, the stability of motion between the first housing 110 and the second housing 120 can be further improved. As described above, the first housing base 310 may be rotatably connected to the first screen supporting plate 210, and the second housing base 320 may be rotatably connected to the second screen supporting plate 220. In the case that the number of the first housing bases 310 and the number of the second housing bases 320 are each plural, at least one of the first housing bases 310 may be rotatably connected to the first screen supporting plate 210, and at least one of the second housing bases 320 may be rotatably connected to the second screen supporting plate 220. More specifically, as shown in FIG. 2, the first housing bases 310 located on two opposite sides of the base portion 410 may be each rotatably connected to the first screen supporting plate 210, and the other first housing bases 310 may be not connected to the first screen supporting plate 210, so that the processing and assembling difficulty of the whole folding mechanism can be reduced on the premise of ensuring higher stability of rotatable matching between the first housing base 310 and the first screen supporting plate 210. This is similar to the case of the second housing base 320, which is not repeated here for the sake of brevity.

Optionally, a gap between the first screen supporting plate 210 and the second screen supporting plate 220 may be smaller. In this case, the flexible display screen can be supported more effectively. Besides, in a case of adopting the above technical solution, the distance between the first screen supporting plate 210 and second screen supporting plate 220 and the base portion 410 may be increased appropriately, so that in the process of the first screen supporting plate 210 and the second screen supporting plate 220 rotating relative to each other along with the first housing base 310 and the second housing base 320, the first screen supporting plate 210 and the second screen supporting plate 220 can, after rotating to be parallel to each other, continue to rotate relative to each other, thereby forming the state shown in FIG. 6. That is, the first screen supporting plate 210 and the second screen supporting plate 220 form a flared structure.

In order to further reduce the thickness of the folding mechanism such that the electronic device using the folding mechanism also has a smaller thickness accordingly, in another embodiment of this application, optionally, as shown in FIG. 3 and FIG. 4, in the unfolded state, the first screen supporting plate 210 and the second screen supporting plate 220 may be arranged at an interval along a direction perpendicular to the rotation axis direction of the second rotation portion 302. Alternatively, in the unfolded state, the first screen supporting plate 210 and the second screen supporting plate 220 are arranged at an interval along direction B in FIG. 3, and the specific size of the interval may be determined according to actual situations, which is not limited here. By adopting the above technical solution, the center of the base portion 410 in direction B is spaced from the first screen supporting plate 210, so that in the process of the first screen supporting plate 210 rotating relative to the base portion 410, even if the distance between the first screen supporting plate 210 and the base portion 410 in the direction perpendicular to direction B is smaller, the first screen supporting plate 210 can still avoid the base portion 410 and rotate to one side of the base portion 410. This is similar to the case of the second screen supporting plate 220, so that the first screen supporting plate 210 and the second screen supporting plate 220 can form the flared structure shown in FIG. 6.

Further, as described above, the folding mechanism may be applied to a support structure. Based on this, an embodiment of this application further provides the support structure. The support structure includes the first housing 110 and the second housing 120. In the process of assembling the support structure, the first housing base 310 is fixedly connected to the first housing 110, and the second housing base 320 is fixedly connected to the second housing 120. While the support structure is unfolded and folded, the first housing 110 and the second housing 120 may respectively drive the first housing base 310 and the second housing base 320 to move relatively, so that the first housing base 310 and the second housing base 320 can rotate relatively.

Specifically, the first housing base 310 and the first housing 110 may be fixed to each other by means of bonding, riveting, snap fit or threaded connection. In order to improve the reliability of connection and reduce the disassembling and assembling difficulty, through holes or threaded holes may be formed on the first housing base 310 and the first housing 110, so that the first housing base 310 and the first housing 110 can be fixedly connected by means of threaded connecting members. Accordingly, the second housing base 320 and the second housing 120 may also be fixed to each other by means of threaded connecting members.

In addition, as described above, the first screen supporting plate 210 and the first housing base 310 may rotate relatively. Therefore, in order to prevent the first housing 110 and the first housing base 310 from hindering the rotation motion of the first screen supporting plate 210, optionally, a side of the first housing 110 and a side of the first housing base 310 facing the first screen supporting plate 210 are each provided with an inclined avoidance supporting surface. In this case, on the one hand, the first screen supporting plate 210 is capable of rotating relative to the first housing base 310 (and the first housing 110), and on the other hand, the inclined avoidance supporting surface can better support the first screen supporting surface, thereby ensuring that the flexible display screen can be well supported.

Accordingly, a side of the second housing 120 and a side of the second housing base 320 facing the second screen supporting plate 220 may be provided with an inclined avoidance supporting surface, so that in the folded state, the first screen supporting plate 210 and the second screen supporting plate 220 can be respectively supported on the corresponding inclined avoidance supporting surfaces, thereby improving the stability of motion of the folding mechanism.

Based on the support structure provided by the above embodiment, further, an embodiment of this application further provides an electronic device. The electronic device includes a first display module 610 and a support structure described above. The first display module 610 includes a flexible display screen. The first display module 610 is mounted on the support structure, and the first display module 610 is supportable on the first housing 110, the second housing 120, the first screen supporting plate 210 and the second screen supporting plate 220, so that the support structure can well support the flexible display screen in the first display module 610. Besides, the electronic device has a folded state and an unfolded state. In the folded state, a distance between respective first side edges 203 of the first screen supporting plate 210 and the second screen supporting plate 220 is greater than a distance between respective second side edges of the first screen supporting plate 210 and the second screen supporting plate 220, so that the electronic device can provide a large flared accommodating space for the middle part of the first display module 610, which can maximally avoid forming a crease at the middle part of the first display module 610 when being folded, thereby prolonging the service life of the first display module.

In order to further improve the usability of the electronic device, optionally, a side of the first housing 110 facing away from the first display module 610 is provided with a second display module 620, and parameters such as size of the second display module 620 may be determined according to actual situations. In a case of adopting the above technical solution, two opposite sides of the first housing 110 are each provided with the display module. By making the electronic device in the folded state, the electronic device is convenient for the user to carry, and moreover, the user can perform man-machine interaction by the aid of the second display module 620. In a case that the user needs to browse videos, the electronic device may be unfolded, so that the user can use the first display module 610 with a larger display area, which can improve the audio-visual experience. Of course, the above scenario is only an example. In a case that software and other conditions are meet, the user may also use the first display module 610 and the second display module 620 at the same time. In other words, when the electronic device is in use, the user may flexibly select the first display module 610 and/or the second display module 620 according to needs, which is not limited here.

The electronic device disclosed in this embodiment of this application may be a smart phone, a tablet computer, an e-book reader or a wearable device. Of course, the electronic device may also be another device, which is not limited in this embodiment of this application.

The above embodiments in this application focus on the differences between the embodiments, and as long as there is no contradiction between different optimization features of the embodiments, they can be combined to form a better embodiment. In consideration of brevity, details will not be repeated here.

The foregoing descriptions are merely embodiments of this application and are not intended to limit this application. For a person skilled in the art, various modifications and variations can be made to this application. Any modification, equivalent replacement, or improvement made without departing from the spirit and principle of this application shall fall within the scope of the claims of this application.

What is claimed is:

1. A folding mechanism, comprising a first screen supporting plate, a second screen supporting plate, a first housing base, a second housing base, and a base portion, wherein the first housing base is arranged on the first screen supporting plate, and the first screen supporting plate rotatably matches the first housing base;

the second housing base is arranged on the second screen supporting plate, and the second screen supporting plate rotatably matches the second housing base;

the base portion is provided with a plurality of first rotation portions, and the first housing base and the second housing base are rotatably connected to the plurality of first rotation portions in a one-to-one correspondence manner by means of respective second rotation portions;

the folding mechanism has an unfolded state and a folded state; in the unfolded state, respective first side edges of the first screen supporting plate and the second screen supporting plate are each located between respective second side edges, and a first surface of the first screen supporting plate and a first surface of the second screen supporting plate facing away from the base portion are flush; and in the folded state, a distance between the respective first side edges of the first screen supporting plate and the second screen supporting plate is greater than a distance between the respective second side edges of the first screen supporting plate and the second screen supporting plate;

wherein the folding mechanism comprises rotation components, the first screen supporting plate is rotatably connected to the first housing base by means of the plurality of rotation components, the rotation component comprising a third rotation portion and a fourth rotation portion, one of the third rotation portion and the fourth rotation portion is connected to the first housing base, the other is connected to the first screen supporting plate, the third rotation portion comprises an insert block, the fourth rotation portion is provided with an insertion slot, the insertion block and the insertion slot are each provided with an arc-shaped matching surface, and the insertion block rotatably matches the insertion slot by means of the arc-shaped matching surfaces.

2. The folding mechanism according to claim 1, wherein the folding mechanism further comprises a lid, the lid is fixedly connected to a side of the base portion facing away from the first screen supporting plate, and in the folded state, a projection of the lid in a plane where a distribution direction of the first screen supporting plate and the second screen supporting plate and a rotation axis direction of the second rotation portion are located covers the first housing base, the second housing base and the base portion.

3. The folding mechanism according to claim 2, wherein the first housing base and/or the second housing base comprise/comprises an avoidance structure, the avoidance structure is provided with an avoidance groove, and in the unfolded state, side edges of the lid are accommodated into the avoidance groove.

4. The folding mechanism according to claim 3, wherein the first screen supporting plate and/or the second screen supporting plate are/is provided with an accommodating sink, and in the folded state, at least a part of the avoidance structure is accommodated in the accommodating sink.

5. The folding mechanism according to claim 1, wherein the base portion is provided with an accommodating slot, the first rotation portions are arranged in the accommodating slot, and at least a part of the second rotation portions of the first housing base and the second housing base are accommodated in the accommodating slot.

6. The folding mechanism according to claim 5, wherein one of the first rotation portion and the second rotation portion comprises a slider, the other is provided with a sliding groove, and the sliding groove slidably matches the slider.

7. The folding mechanism according to claim 6, wherein two opposite sides of the accommodating slot are each provided with the first rotation portion, and two opposite sides of the first housing base and the second housing base each are provided with the second rotation portions.

8. The folding mechanism according to claim 5, wherein in a rotation axis direction of the second rotation portion, the plurality of first rotation portions are arranged at intervals or staggered.

9. The folding mechanism according to claim 1, wherein the fourth rotation portion comprises a limiting member and a matching member, the limiting member and the matching member form the insertion slot, and the matching member is provided with the arc-shaped matching surface; and in a rotation axis direction of the second rotation portion, the respective limiting members of the two fourth rotation portions in the plurality of fourth rotation portions are arranged opposite to each other, and at least two of the third rotation portions are limited between or outside the two limiting members.

10. The folding mechanism according to claim 1, wherein in at least one of the rotation components, the third rotation portion comprises the plurality of insertion blocks arranged at intervals along the rotation axis direction of the second rotation portion, the fourth rotation portion is provided with the plurality of insertion slots arranged at intervals along the rotation axis direction of the second rotation portion, and the plurality of insertion blocks match the plurality of insertion slots in a one-to-one correspondence manner.

11. The folding mechanism according to claim 1, wherein a number of the first housing bases and/or a number of the second housing base are/is plural, at least one of the first housing bases is rotatably connected to the first screen supporting plate, and at least one of the second housing bases is rotatably connected to the second screen supporting plate.

12. The folding mechanism according to claim 1, wherein in the unfolded state, the first screen supporting plate and second screen supporting plate are arranged at an interval along a direction perpendicular to a rotation axis direction of the second rotation portion.

13. A support structure, comprising a first housing, a second housing, and a folding mechanism, wherein folding mechanism comprises a first screen supporting plate, a second screen supporting plate, a first housing base, a second housing base, and a base portion;

the first housing base is arranged on the first screen supporting plate, and the first screen supporting plate rotatably matches the first housing base;

the second housing base is arranged on the second screen supporting plate, and the second screen supporting plate rotatably matches the second housing base;

the base portion is provided with a plurality of first rotation portions, and the first housing base and the second housing base are rotatably connected to the plurality of first rotation portions in a one-to-one correspondence manner by means of respective second rotation portions;

the folding mechanism has an unfolded state and a folded state; in the unfolded state, respective first side edges of the first screen supporting plate and the second screen supporting plate are each located between respective second side edges, and a first surface of the first screen supporting plate and a first surface of the second screen supporting plate facing away from the base portion are flush; and in the folded state, a distance between the respective first side edges of the first screen supporting plate and the second screen supporting plate is greater than a distance between the respective second side edges of the first screen supporting plate and the second screen supporting plate;

a first housing base is fixedly connected to the first housing, and a side of the first housing and a side of the first housing base facing a first screen supporting plate are each provided with an inclined avoidance supporting surface;

a second housing base is fixedly connected to the second housing, and a side of the second housing and a side of the second housing base facing a second screen supporting plate are each provided with an inclined avoidance supporting surface; and in a folded state, the first screen supporting plate and the second screen supporting plate are respectively supported on the corresponding inclined avoidance supporting surface.

14. The support structure according to claim 13, wherein the folding mechanism further comprises a lid, the lid is fixedly connected to a side of the base portion facing away from the first screen supporting plate, and in the folded state, a projection of the lid in a plane where a distribution direction of the first screen supporting plate and the second screen supporting plate and a rotation axis direction of the second rotation portion are located covers the first housing base, the second housing base and the base portion.

15. The support structure according to claim 14, wherein the first housing base and/or the second housing base comprise/comprises an avoidance structure, the avoidance structure is provided with an avoidance groove, and in the unfolded state, side edges of the lid are accommodated into the avoidance groove.

16. The support structure according to claim 15, wherein the first screen supporting plate and/or the second screen supporting plate are/is provided with an accommodating sink, and in the folded state, at least a part of the avoidance structure is accommodated in the accommodating sink.

17. The support structure according to claim 13, wherein the base portion is provided with an accommodating slot, the first rotation portions are arranged in the accommodating slot, and at least a part of the second rotation portions of the first housing base and the second housing base are accommodated in the accommodating slot.

18. An electronic device, comprising a first display module and a support structure according to claim 13, wherein the first display module comprises a flexible display screen, the first display module is mounted on the support structure, and the first display module is supportable on a first housing, a second housing, a first screen supporting plate a second screen supporting plate.

19. The electronic device according to claim 18, wherein a side of the first housing facing away from the first display module is provided with a second display module.

* * * * *